(12) United States Patent
Endt et al.

(10) Patent No.: US 8,590,958 B2
(45) Date of Patent: Nov. 26, 2013

(54) SEAT ARRANGEMENT FOR A MOTOR VEHICLE WITH A RAIL GUIDE FOR A VEHICLE SEAT

(75) Inventors: Thomas Endt, Ruesselsheim (DE); Stefan Neuhaeuser, Niedernhausen (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/602,527

(22) Filed: Sep. 4, 2012

(65) Prior Publication Data

US 2013/0057014 A1    Mar. 7, 2013

(30) Foreign Application Priority Data

Sep. 5, 2011   (DE) .......................... 10 2011 112 305

(51) Int. Cl.
*B60N 2/20* (2006.01)
(52) U.S. Cl.
USPC ...................................... 296/65.13; 296/65.11
(58) Field of Classification Search
USPC ........... 296/65.13, 65.14, 65.15, 65.11, 65.12
See application file for complete search history.

(56) References Cited

U.S. PATENT DOCUMENTS

| 6,883,853 B2 | 4/2005 | Otto |
| 7,992,914 B2 | 8/2011 | Maier et al. |
| 2010/0164267 A1 | 7/2010 | Maier |

FOREIGN PATENT DOCUMENTS

| DE | 102006022732 A1 | 11/2007 |
| WO | 2010020262 A1 | 2/2010 |

*Primary Examiner* — Joseph Pape
*Assistant Examiner* — Dana Ivey
(74) *Attorney, Agent, or Firm* — Ingrassia Fisher & Lorenz, P.C.

(57) ABSTRACT

A seat arrangement for a motor vehicle includes a vehicle seat that can be shifted in the longitudinal and transverse direction. A rail guide has a guide component fixedly anchored to the seat or vehicle and a guide rail fixedly anchored to the vehicle or seat along which the guide component is rail-guide. An installation section has a locking device that is moved from a release position in which the guide component is guided along the installation section or introduced into the installation section, into a locked position, in which the installation section is locked relative to the guide component by the locking device.

18 Claims, 3 Drawing Sheets

SEAT ARRANGEMENT FOR A MOTOR VEHICLE WITH A RAIL GUIDE FOR A VEHICLE SEAT

CROSS-REFERENCE TO RELATED APPLICATION

This application claims priority to German Patent Application No. 10 2011 112 305.2, filed Sep. 5, 2011, which is incorporated herein by reference in its entirety.

TECHNICAL FIELD

The technical field relates to a seat arrangement for a motor vehicle with a vehicle seat that can be shifted in the longitudinal and transverse direction, wherein a rail guide is allocated to the vehicle seat, which exhibits a guide component on the one hand and a guide rail on the other, along which the guide component is rail-guided.

BACKGROUND

DE 10 2006 022 732 A1 describes a seat arrangement for a motor vehicle. The known seat arrangement exhibits a vehicle seat that is secured inside the motor vehicle by means of longitudinal and transverse rails, and can be shifted along the longitudinal and transverse rails in the longitudinal and transverse direction. In order to force the vehicle seat to perform a predetermined sequence of movements when shifted in the longitudinal and transverse direction, the vehicle seat has allocated to it a rail guide that exhibits a pin fixedly anchored to the seat on the one hand and a guide block fixedly anchored to the vehicle on the other, along which the pin, and hence the vehicle seat, is rail-guided. As a consequence, the vehicle seat can be shifted via the pin inside the guide block into its various operating positions.

While the known seat arrangements have proven effective, they are disadvantageous from the standpoint that the attachment sites used to secure the vehicle seat or its lower seat structure to the motor vehicle are covered from above in the various operating positions by either the vehicle seat itself or its lower seat structure. For example, these attachment sites can be screw holes in the lower seat structure by means of which the lower seat structure, and hence the vehicle seat itself, is connected to the floor of the motor vehicle using screws. However, if the attachment sites are covered from above, the assembly becomes difficult, if not impossible.

Therefore, at least one object herein is to provide a seat arrangement for a motor vehicle with a vehicle seat that can be shifted in the longitudinal and transverse direction and has a rail guide, which ensures the assembly or attachment of the vehicle seat inside the motor vehicle while retaining the same compact structural design of the vehicle seat and its lower seat structure. In addition, other objects, desirable features and characteristics will become apparent from the subsequent summary and detailed description, and the appended claims, taken in conjunction with the accompanying drawings and this background.

SUMMARY

An embodiment relates to a seat arrangement for a motor vehicle with a vehicle seat that can be shifted in the longitudinal and transverse direction. The capability of shifting in a longitudinal and transverse direction is here, in an embodiment, realized by means of longitudinal and transverse guides, for example that can be designed as rail guides, and/or essentially comprise the lower seat structure for the vehicle seat. The exemplarily cited longitudinal and transverse guides would make it possible to shift the vehicle seat into any operating position desired within a plane spanned by the longitudinal and transverse directions. However, in order to confine the vehicle seat to a limited or predetermined motion, a rail guide is also allocated to the vehicle seat. The rail guide is, for example, configured to be independent of the exemplarily cited longitudinal and transverse guides. The rail guide itself exhibits a guide component fixedly anchored to the seat or vehicle on the one hand, and a guide rail fixedly anchored to the vehicle or seat on the other. Even though it is preferred that the guide component be fixedly anchored to the seat and the guide rail to be fixedly anchored to the vehicle, it is also possible to fixedly anchor the guide component to the vehicle, and have the guide rail be fixedly anchored to the seat. The guide component can be a protruding shoulder, for example, and is rail-guided along the guide rail. However, the guide rail of the rail guide not only has sections that allow the vehicle seat to shift into its operating positions; rather, the guide rail also exhibits a section referred to as the installation section. A locking device is allocated to this installation section. The locking device can be moved from a release position, in which the guide component can be guided along the installation section or introduced into the installation section, into a locked position, in which the installation section is locked relative to the guide component by the locking device.

In this regard, in the installation section of the guide rail, the vehicle seat and/or its substructure can be moved into an installation position during assembly, in that the guide component can be pushed into the installation section of the guide rail. In this installation position, the vehicle seat or its lower seat structure can assume a position in which the latter do not cover the attachment sites for securing the vehicle seat or lower seat structure to the motor vehicle from above, thereby simplifying installation when the vehicle seat or its lower seat structure is shifted into the installation position. However, the installation section can also be provided in such a way as to allow the vehicle seat or lower seat structure to be shifted into an installation position making it possible to also reach or access other locations of the motor vehicle, lower seat structure or vehicle seat more easily, so as to simplify installation. Once installation has been completed, the guide component can be shifted out of the installation section into the other sections of the guide rail of the rail guide, so that the vehicle seat assumes an operating position in which the vehicle passengers can use the vehicle seat. When then moved into the locked position, the locking device prevents the guide component from again being introduced into the installation section, so that the vehicle seat can no longer be moved from its operating position into the now undesirable installation position when in use. In other words, the installation section facilitates the assembly of the vehicle seat or its lower seat structure inside the motor vehicle by providing another way of moving the vehicle seat, while the locking device thereafter again eliminates this ability to move, which is not desired during use, by locking the installation section in the locked position relative to the guide component. As a consequence, this installation section combined with the locking device ensures a simple assembly process, without in the process having to do without an especially compact structural design of the lower seat structure allocated to the vehicle seat.

In an exemplary embodiment of the seat arrangement, the locking device is configured in such a way that it can be automatically moved from the release position into the locked position to further simplify installation. In this conjunction, it has proven expedient that the locking device be automatically moved or movable from the release position into the locked position by shifting the vehicle seat in a longitudinal and/or transverse direction, as in this embodiment. In addition, in an embodiment, it is possible to automatically move the locking device from the release position into the locked position by mechanically coupling the movement of the vehicle seat with the movement of the locking device, especially since the mechanical coupling can be easily realized without any major outlay in light of the tightly adjacent components, so that the compact structural design of the seat arrangement can be retained.

In order to achieve a simple structural design that is relatively insusceptible to failure, another embodiment of the seat arrangement involves configuring the locking device in such a way that it can swivel from the release position into the locked position. To this end, the locking device exhibits a swiveling locking element to release or lock the installation section, wherein the locking element can potentially be configured as a pivot lever. The locking element is here arranged in such a way that the guide component guided along the guide rail can be pressed against the locking element while swiveling the locking element and moving the locking device into the locked position. In other words, the movement of the vehicle seat is mechanically coupled with the movement of the locking element in the locking device by way of the guide component guided along the guide rail in this embodiment. This eliminates the need for complicated mechanisms, especially since the already present guide component of the rail guide is used to couple the mentioned movements.

In order to simplify the assembly of the vehicle seat inside the motor vehicle even more, the locking device in an embodiment of the seat arrangement is configured in such a way that the locking device, if necessary its locking element, can be clamped or is clamped in the locked position automatically. In an embodiment, the locking device, if necessary its locking element, can be latched or is latched in the locked position. In this regard, the technician no longer has to get to the already difficultly accessible location of the rail guide preferably provided underneath the vehicle seat in order to manually engage the clamp. Latching the locking device or locking element in the locked position also yields an especially compact structural design, especially since the resilient latching means can be arranged in a small area. To enable a subsequent disassembly of the vehicle seat in this embodiment nonetheless, for example as might become necessary during maintenance, the locking device, if necessary its locking element, can be clamped or latched in the locked position, for example in a detachable manner. In this embodiment, it is preferred that force transmission means, for example a Bowden cable, be provided to impart a separation force indirectly to the locking device or locking element, so as not to have to get to a difficultly accessible location in this case either.

In another embodiment of the seat arrangement, the guide rail of the rail guide is designed as a recess and/or depression in a sheet metal part. Designing the guide rail as a recess and/or depression in a sheet metal part creates a space-saving and stable guide rail on the one hand, which is especially simple to manufacture on the other. Consequently, this embodiment results in an especially compact and stable structural design for the seat arrangement. In this embodiment, the locking element is pivoted to the sheet metal part. This also yields a space-saving arrangement, wherein it is also preferred in the mentioned embodiment that the locking element be designed as a plastic part, which preferably exhibits a greater resiliency than the sheet metal part. Therefore, the plastic part could serve as the more elastically deformable part in a latched connection between the sheet metal part and the plastic part. In this embodiment, the locking element is designed like a plate and/or arranged parallel to the sheet metal part, for example in a horizontal plane, so as to yield a particularly space-saving or flat structural design that enables a compact structural design of the lower seat structure of the vehicle seat.

In another embodiment of the seat arrangement, the locking element exhibits a first latching means that can be latched in the locked position with a second latching means on the sheet metal part. The first latching means in an embodiment involves a latching projection, which can be latched into a latching recess or latching depression that makes up the second latching means. While the two mentioned latching means can basically also be designed vice versa, in an embodiment the first latching means comprises the latching projection, while the second latching means consists of a latching recess or latching depression. In this embodiment, the first latching means, possibly the latching projection, is provided on the side of the locking element facing the sheet metal part, e.g., on its front or back side. The first latching means could take the form of the latching projection, for example consisting of a convex curvature in the plate-shaped locking element.

In another embodiment of the seat arrangement, the guide rail exhibits a first guide section extending in a longitudinal direction, into which the installation section runs laterally. To an especially great extent, this configuration ensures that the guide component is not inadvertently moved in the direction of the installation section, where it would place an excessive burden on the locking device or locking element in the locked position, for example as could be the case if the installation section were to run into the end of the first guide section, with which the installation section also aligns flush. In this embodiment, the first guide section extends exclusively in the longitudinal direction. In addition, in this embodiment the installation section between the ends of the first guide section run laterally into the first guide section, so as to enhance the advantages enumerated above even more. In order to further reduce the burden placed on the locking device or locking element in the locked position and prevent the guide component from undesirably being guided back into the installation section during normal use of the vehicle seat, in an embodiment, the installation section extends at a right angle to the first guide section and/or exclusively in the transverse direction. In addition, in this embodiment, the installation section is configured as a kind of cul-de-sac, so that the end of the installation section of the guide rail facing away from the first guide section similarly acts as a stop for the vehicle seat in an installation position, which the guide component can strike against.

In another embodiment of the seat arrangement, the guide rail of the rail guide exhibits at least one inclined second guide section, which extends transverse to the longitudinal direction and transverse to the transverse direction, and adjoins the first guide section toward the back in the longitudinal direction. In this embodiment, the second guide section proceeds from the first guide section and extends in the same transverse direction as the installation section and/or that the second guide section extends transverse to the longitudinal direction in such a way that the vehicle seat is automatically also shifted toward the middle of the vehicle given a shift toward the back in the longitudinal direction. In the first variant, the component exhibiting the guide rail, e.g., the sheet metal part, can exhibit an especially small width in the transverse direction, while the second variant ensures a particularly comfortable handling of the vehicle seat, especially since the operator only has to push the vehicle seat toward the back in a longitudinal direction to also shift the vehicle seat toward the middle of the vehicle. In the present embodiment, the guide rail of the rail guide exhibits a third guide section, which adjoins the second guide section toward the back in a longitudinal direction, and if necessary extends exclusively in the longitudinal direction. As a consequence, the first and third guide sections can in this embodiment serve essentially to longitudinally shift the vehicle seat, while the inclined second guide section simultaneously makes it possible to shift the vehicle seat in the transverse direction. This design variant makes sense in particular when shifting the vehicle seat toward the back in a longitudinal direction causes it to shift from a front region of the motor vehicle interior into a back region of the motor vehicle interior having a smaller width, e.g., due to the inwardly bulging wheel houses. For example, this embodiment has proven expedient in particular for a seat arrangement in which the vehicle seat is an outside seat in the second or third row of seats in the motor vehicle.

As already explained at the outset, the additional installation section of the rail guide can help improve the accessibility of an attachment site with which the vehicle seat can be secured or is secured to the motor vehicle while assembling the vehicle seat in the motor vehicle. One embodiment of the seat arrangement provides at least one attachment site with which the vehicle seat can be secured or is secured to the motor vehicle. For example, the attachment site can be a screw hole, into which a screw can be introduced, or something similar. In an operating position of the vehicle seat, in which the guide component is located outside the installation section of the guide rail, preferably in the first guide section of the guide rail, the attachment site is covered from above by the vehicle seat or a lower seat structure, for example which can also include the transverse or longitudinal rail guides for shifting the vehicle seat. Therefore, the attachment site is difficult if not impossible to access in at least one operating position of the vehicle seat. By contrast, the attachment site can be accessed from above in an installation position of the vehicle seat in which the guide component is situated inside the installation section of the guide rail of the rail guide, so that a screw for attaching the lower seat structure or vehicle seat to the motor vehicle can simply be introduced to the attachment site and actuated to join the mentioned components. In this embodiment, the attachment site is covered from above by the vehicle seat or lower seat structure in each operating position of the vehicle seat, meaning in each position of the vehicle seat in which the guide component lies outside the installation section, but inside the guide rail.

In order to allow the vehicle seat to shift in the longitudinal and transverse direction as mentioned at the outset, another embodiment of the seat arrangement provides at least one longitudinal guide rail, preferably two longitudinal guide rails, for shifting the vehicle seat in a longitudinal direction, and a transverse guide rail, preferably two transverse guide rails, for shifting the vehicle seat in a transverse direction.

Another embodiment of the seat arrangement provides clamping means separate from the rail guide for clamping the vehicle seat in the longitudinal and transverse direction, which are for example arranged on or in the longitudinal and transverse guide rail. In this embodiment, the rail guide, e.g., the guide rail and guide component, thus has no clamping function; rather, any forces acting on the clamped seat are supported by the clamping means, without having to be handled by the guide component and the guide rail of the rail guide. Therefore, the rail guide can be given a relatively simple design, without having to use especially stable and/or large-scale components for the rail guide. Moreover, arranging the clamping means on or in the longitudinal and transverse guide rail yields an especially compact structural design for the seat arrangement.

BRIEF DESCRIPTION OF THE DRAWINGS

The various embodiments will hereinafter be described in conjunction with the following drawing figures, wherein like numerals denote like elements, and wherein.

DETAILED DESCRIPTION OF THE DRAWINGS

The following detailed description is merely exemplary in nature and is not intended to limit the various embodiments or the application and uses thereof. Furthermore, there is no intention to be bound by any theory presented in the preceding background or the following detailed description.

Figure 1:
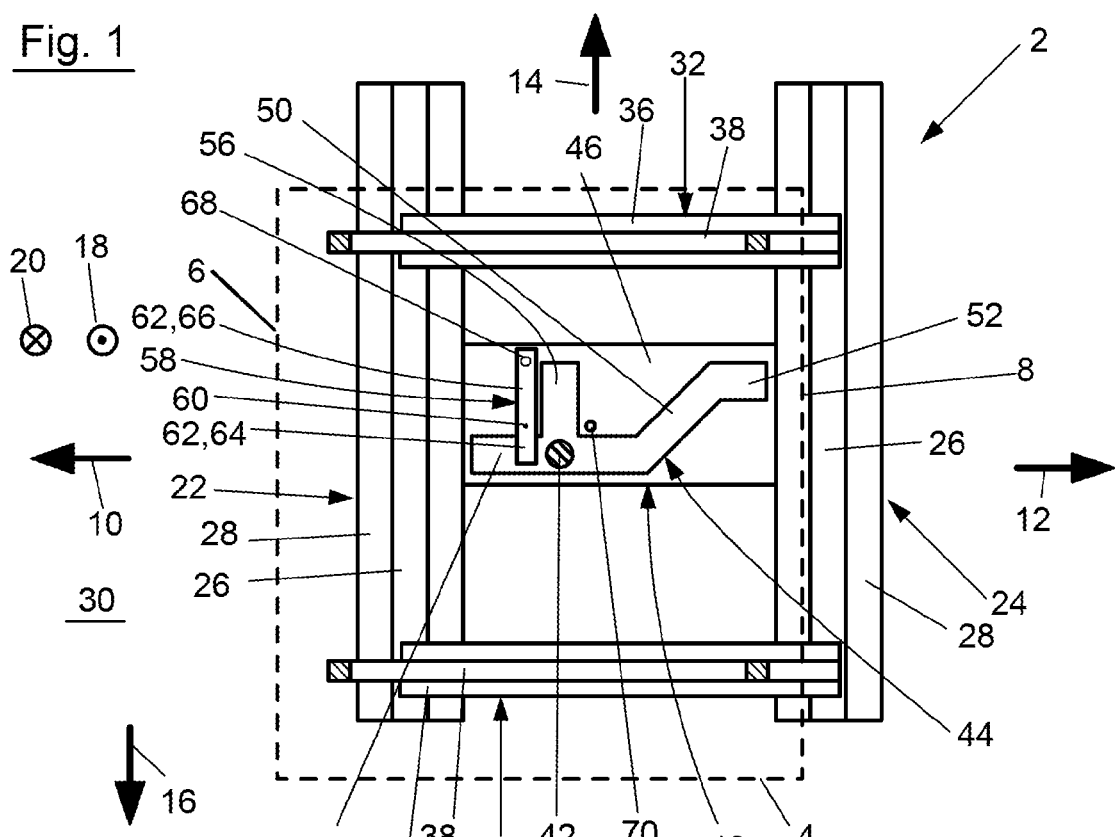
FIG. 1 is a top view of an exemplary embodiment of the seat arrangement with the vehicle seat in a first operating position.

FIG. 1 presents a top view of an embodiment of the seat arrangement 2 in a motor vehicle. The seat arrangement 2 exhibits a vehicle seat 4, which is composed of a seat section 6 and a backrest 8, wherein the vehicle seat 4 on FIG. 1 is only denoted by a dashed line to provide better clarity. The mutually opposing longitudinal directions 10, 12, the mutually opposing transverse directions 14, 16, and the mutually opposing vertical directions 18, 20 of the vehicle seat 4 are denoted by corresponding arrows, wherein the mentioned directions similarly correspond to the directions of the accompanying motor vehicle. In the embodiment shown, the longitudinal direction 10 thus corresponds to the forward direction of the motor vehicle as well as the seat direction of the vehicle seat 4, while the longitudinal direction 12 corresponds to the reverse direction of the motor vehicle.

The seat arrangement 2 exhibits two transverse guide rails 22, 24. The transverse guide rails 22, 24 are spaced apart from each other in the longitudinal direction 10, 12, and extend parallel to each other in the transverse direction 14, 16. The transverse guide rails 22, 24 each encompass a first rail 26, which is guided in a second rail 28 so that it can shift in the transverse direction 14, 16. The two transverse guide rails 22, 24 allow the vehicle seat 4 to shift in the transverse directions 14, 16, and are arranged in depressions in the vehicle floor 30 (not shown in any greater detail), wherein the depressions also extend in the transverse direction 14, 16. The depressions (not shown in any greater detail) and transverse guide rails 22, 24 are here adjusted relative to each other in such a way that the upper side of the transverse guide rails 22, 24 is situated in a plane with the upper side of the vehicle floor 30.

In an embodiment, the first rails 26 are each joined with a first longitudinal guide rail 32 and a second longitudinal guide rail 34. The two longitudinal guide rails 32, 34, which are used to allow the vehicle seat 4 to shift in the longitudinal direction 10, 12, are arranged parallel relative to each other and spaced apart from each other in the transverse direction, while extending in the longitudinal direction 10, 12. The longitudinal guide rails 32, 34 are also each composed of a first rail 36 and a second rail 38, wherein the first rail 36 is guided in the second rail 38 in the longitudinal direction and can be longitudinally shifted. The first rails 36 of the longitudinal guide rails 32, 34 are joined with the seat section 6 of the vehicle seat 4. As a consequence, the vehicle seat 4 is arranged on the longitudinal guide rails 32, 34 so that it can shift in the longitudinal direction 10, 12, while the longitudinal guide rails 32, 34 are situated on the transverse guide rails 22, 24 so that they can shift in the transverse direction 12, 14, wherein the transverse guide rails 22, 24 are located underneath the longitudinal guide rails 32, 34.

In another embodiment the seat arrangement 2 further exhibits a rail guide 40, which is configured as a kind of sliding block guide. The rail guide 40 exhibits a guide component 42 fixedly anchored to the seat on the one hand, and a guide rail 44 on the other, which is comprised of a recess and/or depression in a sheet metal part 46 fixedly anchored to the vehicle. More precisely, the sheet metal part 46 is attached to the vehicle floor 30. The guide component 42 is secured to the seat section 6 of the vehicle seat 4, and in the vertical direction 20 extends downwardly into the guide rail 44, in which the guide component 42—and thus the vehicle seat 4 as well—is rail-guided.

In a further embodiment, the guide rail 44 exhibits a first guide section 48, which proceeds from an end resembling a cul-de-sac and extends toward the back in exclusively a longitudinal direction 12. At its end pointing toward the back in the longitudinal direction 12, the first guide section 48 passes over into an inclined second guide section 50. The second guide section 50 extends both transverse to the longitudinal direction 10, 12, as well as transverse to the transverse direction 14, 16. More precisely, the second guide section 50 proceeds from the end of the first guide section 48, extending at an inclination in the transverse direction 14 toward the middle of the vehicle, and at an inclination in the longitudinal direction 12 toward the back. Consequently, the second guide section 50 extends transversely to the longitudinal direction 10, 12 in such a way that the vehicle seat 4, when shifted in the longitudinal direction 12 toward the back, is automatically also shifted in the transverse direction 14 or toward the middle of the vehicle. In addition, the guide rail 44 exhibits a third guide section 52, which adjoins the second guide section 50 in a longitudinal direction 12 toward the back, and extends exclusively in the longitudinal direction 10, 12.

Figure 2:
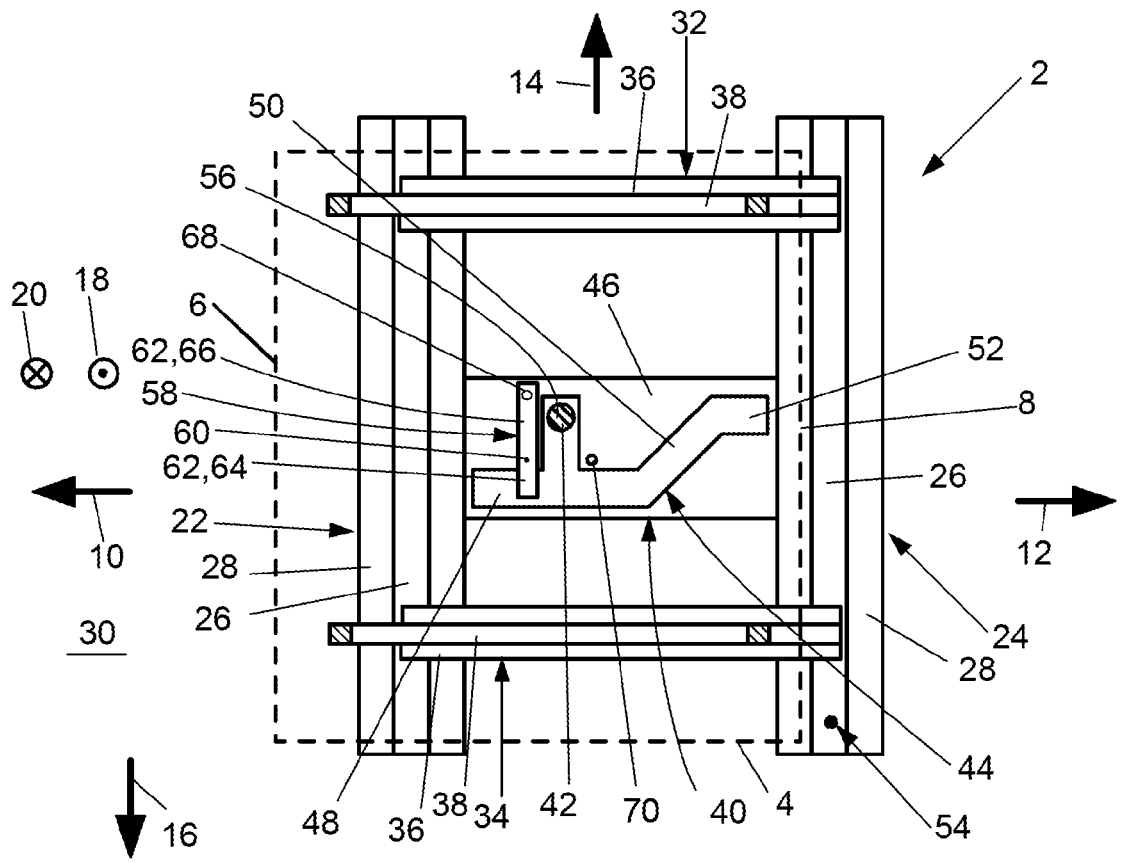
FIG. 2 is the seat arrangement on FIG. 1 with the vehicle seat in an installation position.

FIG. 2 schematically denotes an attachment site 54, which is covered on FIG. 1, by means of which the vehicle seat 4 can be secured or is secured to the motor vehicle. For example, the attachment site 54 can be a screw hole, a flange section or the like, which is used to attach the vehicle seat 4 to the motor vehicle. The present example relates to a screw hole, into which a screw (not shown) is introduced for attachment purposes. The attachment site 54 is provided in the form of the screw hole on the transverse guide rail 24 in the embodiment depicted, more precisely on its second rail 28, in order to secure the transverse guide rail 24, which together with the transverse guide rail 22 and longitudinal guide rails 32, 34 is designed as part of the lower seat structure of the vehicle seat 4, to the vehicle floor 30. The attachment site 54 will be discussed in even greater detail further below.

In addition to the first, second and third guide section 48, 50, 52, in an embodiment, the guide rail 44 described above also exhibits an installation section 56. The installation section 56 runs laterally into the first guide section 48 between the ends of the first guide section 48. The installation section 56 here extends at a right angle to the first guide section 48, and exclusively in the transverse direction 14, 16. The installation section 56 proceeds from the first guide section 48 and extends in the transverse direction 14, wherein the installation section 56 is closed at its end facing away from the first guide section 48, thereby resembling a kind of cul-de-sac. Consequently, the installation section 56 proceeds from the first guide section 48 and extends in the same transverse direction 14 as the second guide section 50, making it possible to achieve a compact structural design for the sheet metal part 46, which only exhibits a small width in the transverse directions 14, 16.

In an embodiment, a locking device 58 is allocated to the installation section 56. The locking device 58 exhibits a locking element 62 that can pivot around a swiveling axis 60 and extends in the vertical direction 18, 20 for releasing or locking the installation section 56. In other words, the locking device 58 or its locking element 62 can be pivoted from the release position on FIGS. 1 and 2 into the locked position according to FIGS. 3 to 6, as will be explained later in greater detail. The locking element 62 designed like a lever exhibits a first leg 64 and second leg 66, which meet in the area of the swiveling axis 60, and proceeding from the swiveling axis 60 extend in different, preferably opposing directions. The locking element 62 is designed as a plastic part, and arranged on the sheet metal part 46 so that it can pivot around the swiveling axis 60. The locking element 62 is here plate-shaped or plate-like in configuration, wherein the plate-like locking element 62 is situated parallel to the sheet metal part 46 in a horizontal plane spanned by the longitudinal directions 10, 12 and transverse directions 14, 16. This yields an especially space-saving and compact structural design in terms of expansion in the vertical direction 18, 20.

In another embodiment, on its side facing the sheet metal part 46, the second leg 66 of the locking element 62 exhibits a first latching means 68, which is denoted on the figures by means of a thinner line, especially since it is located on the side of the second leg 66 facing way from the observer. In the embodiment shown, the first latching means 68 involves a latching projection, which in the vertical direction 20 projects downwardly or toward the sheet metal part 46. By contrast, the sheet metal part 46 is provided with a second latching means 70, which in the present example consists of a latching recess or depression. The first latching means 68 can latch with the second latching means 70 in the locked position of the locking device 58, as will be explained in greater detail below.

Additional features of the seat arrangement 2 and how they function will be explained in the following, drawing reference to FIGS. 1 to 6.

The locking device 58 on FIG. 1 is in a release position, in which the guide component 42 of the rail guide 40 of the first guide section 48 along with the vehicle seat 4 can be introduced into the installation section 56 in the transverse direction and guided along the installation section 56. As further evident from FIGS. 1 and 3 to 6, the attachment site 54 is covered from above by either the vehicle seat 4 (FIGS. 5 and 6) or the lower seat structure in the form of the second longitudinal guide rail 34 (FIGS. 1 and 3) in all operating positions of the vehicle seat 4 in which the guide component 42 is situated outside the installation section 56 of the guide 44. In the operating position according to FIG. 4, the attachment site 54 is even covered from above by both the second longitudinal guide rail 34 and the vehicle seat 4. Consequently, the attachment site 54 in the operating positions of the vehicle seat 4 in which the guide component 42 of the rail guide 40 lies outside the installation section 56 is difficult if not impossible to access, which under normal circumstances would greatly impede the assembly process. In order to get to the attachment site 54, the vehicle seat 4 is therefore shifted in the transverse direction 14, so that the guide component 42 is introduced into the installation section 56, and guided along the latter in the transverse direction 14. Since the locking device 58 or its locking element 62 is in the release position, this can be accomplished without any problem.

FIG. 2 shows the vehicle seat 4 shifted in the transverse direction 14, wherein the guide component 42 has advanced all the way up to the end of the installation section 56 facing away from the first guide section 48. In this installation position of the vehicle seat 4, in which the guide component 42 is located inside the installation section 56 of the guide rail 44, the attachment site 54 is not covered from above by either the second longitudinal guide rail 34 of the lower seat structure or the vehicle seat 4 itself, making the attachment site 54 readily accessible from above. Consequently, the lower seat structure can be easily secured to the vehicle floor 30 with the vehicle seat 4 situated in the installation position according to FIG. 2, which the vehicle seat 4 can assume due to the presence of the installation section 56, and because the locking device 58 is in the release position.

In an embodiment, once secured to the vehicle floor 30 via the attachment site 54, the vehicle seat 4 can again be shifted in the transverse direction 16 from the installation position according to FIG. 2 into the operating position according to FIG. 1. Since the installation section 56 is to be used exclusively for purposes of simplifying assembly, but not to provide an additional movement range while utilizing the vehicle seat 4 during operation or use, the locking device 58 can be moved to the locked position according to FIG. 3, in which the installation section 56 is locked relative to the guide component 42 by the locking device 58.

To this end, the vehicle seat 4 is shifted from the operating position according to FIG. 1 in the longitudinal direction 10 toward the front. As a result, the guide component 42 presses in the longitudinal direction 10 against the first leg 64 of the locking element 62, which in the release position of the locking device 58 extends along the first guide section 48 of the guide rail 44 in the movement range of the guide component 42. Shifting the vehicle seat 4 in a the longitudinal direction 10 causes the guide component 42 to move further in the longitudinal direction 10 along the first guide section 48, so that the locking element 62 pivots around the swiveling axis 60, and the locking device 58 moves into the locked position according to FIG. 3. In other words, the locking device 58 is automatically moved from the release position according to FIG. 1 into the locked position according to FIG. 3 by shifting the vehicle seat 4 in the longitudinal direction 10, wherein this is accomplished by mechanically coupling the movement of the vehicle seat 4 with the movement of the locking device 58 or locking element 62 via the guide component 42.

Figure 3:
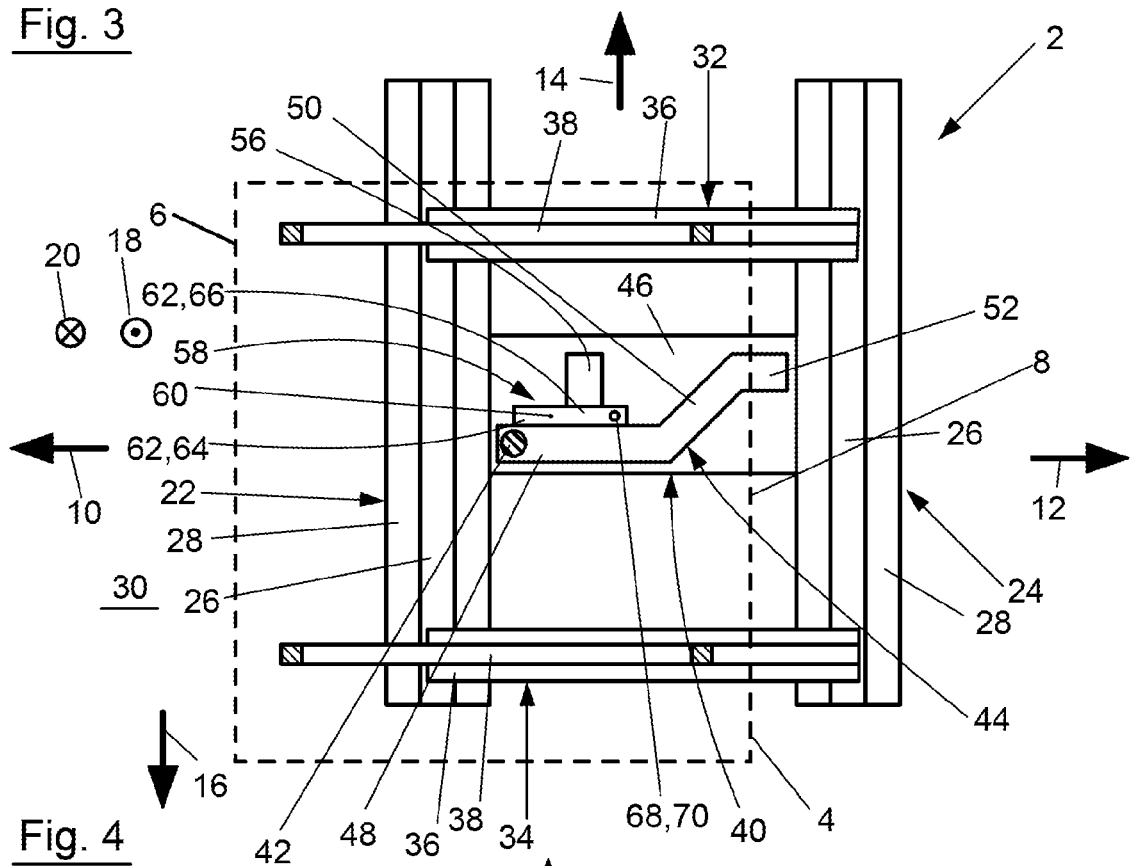
FIG. 3 is the seat arrangement on FIG. 2 with the vehicle seat in a second operating position.
Figure 4:
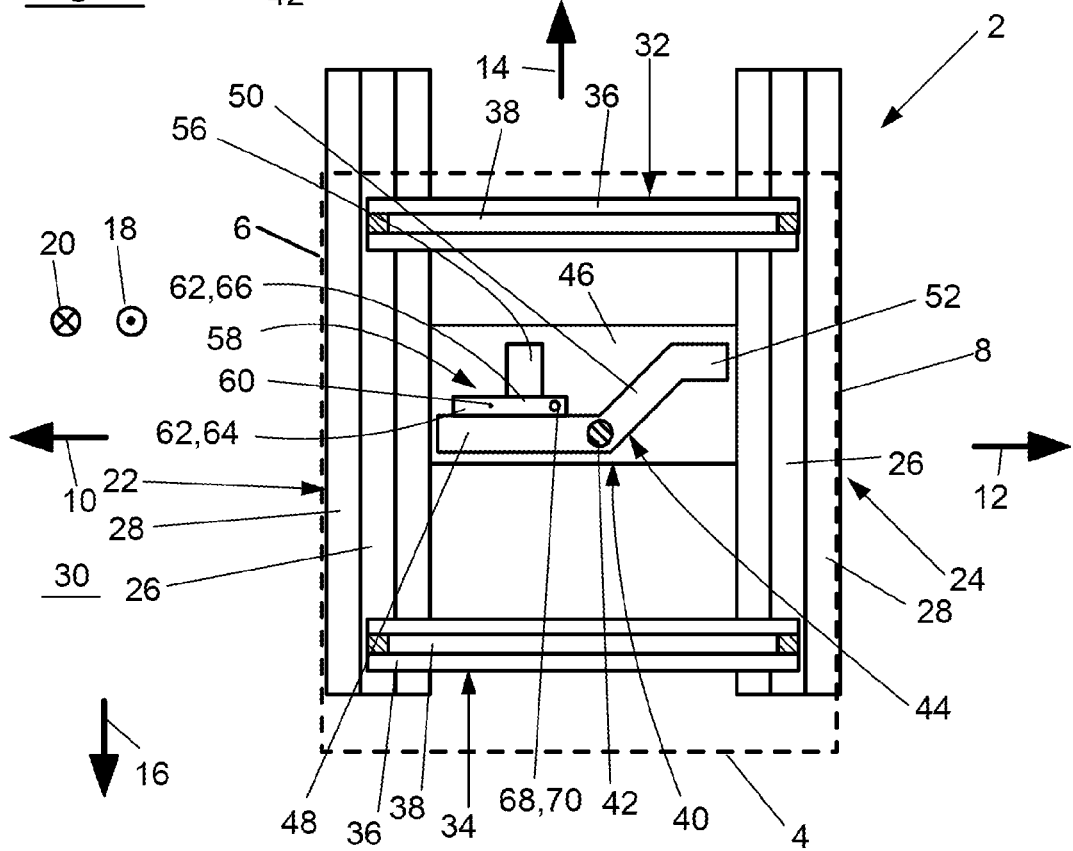
FIG. 4 is the seat arrangement on FIG. 3 with the vehicle seat in a third operating position.
Figure 5:
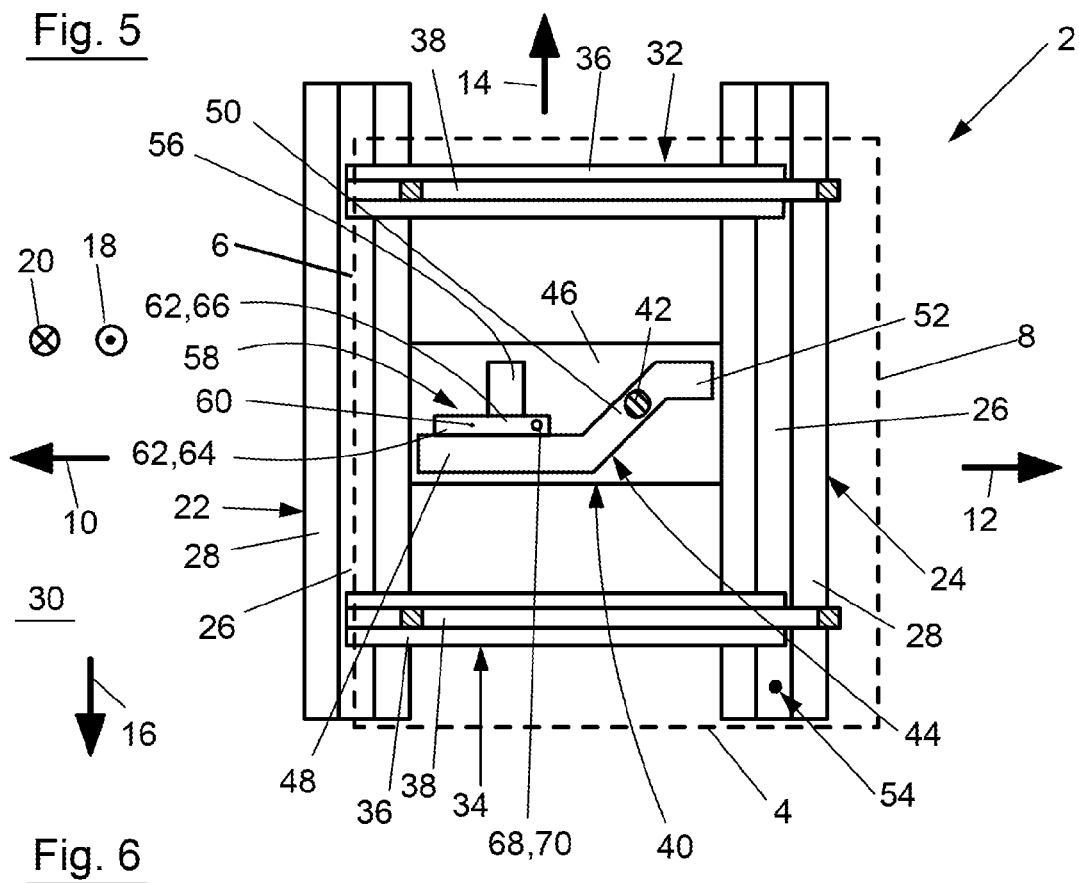
FIG. 5 is the seat arrangement on FIG. 4 with the vehicle seat in a fourth operating position.
Figure 6:
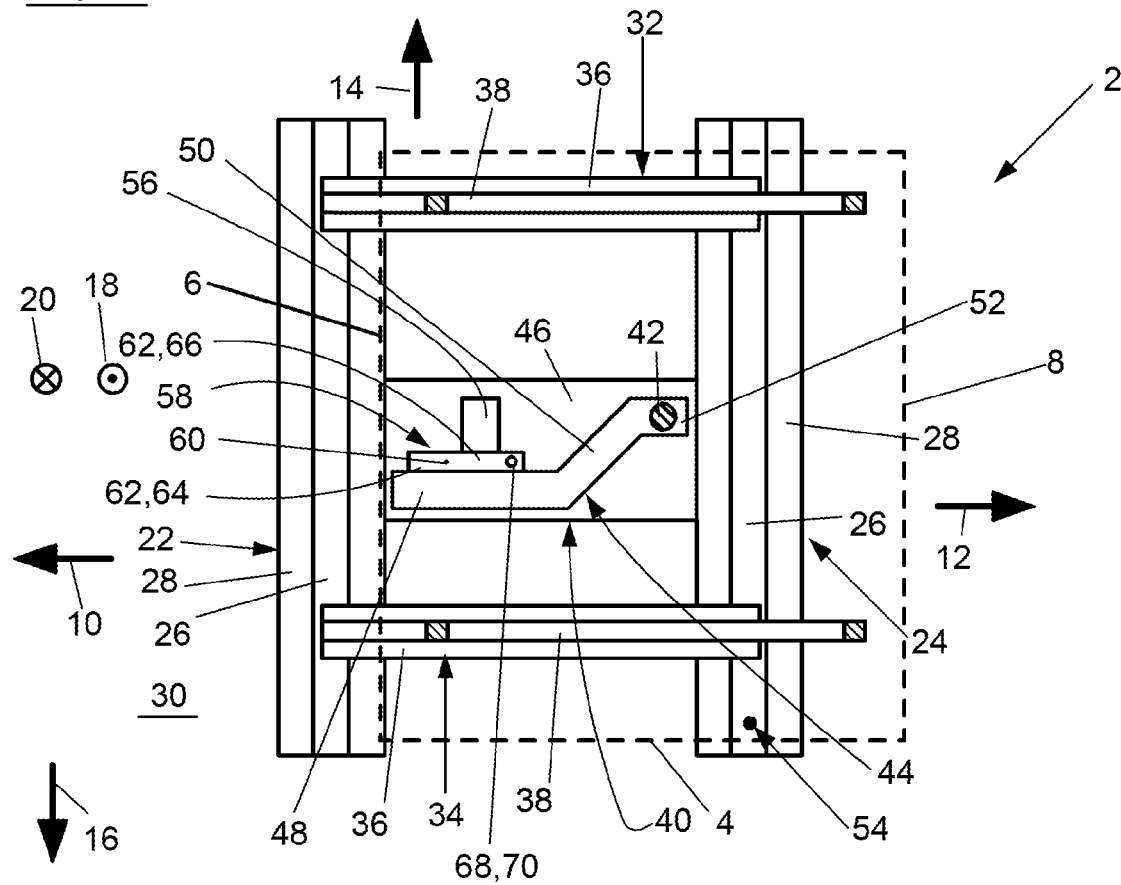
FIG. 6 is the seat arrangement on FIG. 5 with the vehicle seat in a fifth operating position.

Once the locking device 58 or locking element 62 has reached the locked position according to FIG. 3, the locking device 58 or its locking element 62 are automatically clamped in the locked position when the first latching means 68 of the locking element 62 latches with the second latching means 70 on the sheet metal part 46, according to an embodiment. The locking device 58 or locking element 62 is clamped or latched in the locked position in this way, so that the locking element 62 prevents the guide component 42 from passing from the first guide section 48 into the locked installation section 56 during the normal use of the vehicle seat 4. Even so, the clamping device is designed in such a way as to detachably clamp or latch the locking device 58 or its locking element 62 in the locked position, for example to also make it easy to dismantle the vehicle seat 4 or lower seat structure for maintenance.

Proceeding from the operating position according to FIG. 3, once the locking device 58 has been moved into its locked position, the vehicle seat 4 can be used like a conventional vehicle seat with a guide rail having no installation section, according to an embodiment. The vehicle seat 4 can thus be shifted along the guide sections 48, 50, 52 of the guide rail 44 into various operating positions, which are exemplarily shown on FIGS. 3 to 6. As evident here from the depictions according to FIGS. 3 to 6, the attachment site 54 in all operating positions of the vehicle seat 4 is covered from above by the vehicle seat 4 itself, the second longitudinal guide rail 45 or both, so that simplified assembly in the embodiment shown only becomes possible if the locking device 58 has been moved into the release position according to FIGS. 1 and 2, and the vehicle seat 4 has been moved into the installation position according to FIG. 2.

Even though not shown on FIGS. 1 to 6, clamping means designed separately from the rail guide 40 are further provided for clamping the vehicle seat 4 in a longitudinal and transverse direction 10, 12, 14, 16, which are preferably arranged on or in one of the longitudinal guide rails 32, 34 and one of the transverse guide rails 22, 24. Providing clamping means designed separately from the rail guide 40 for clamping the vehicle seat 4 in a longitudinal and transverse direction 10, 12, 14, 16 unburdens the rail guide 40, especially since clamping does not have to take place by supporting the guide component 42 against the edge of the guide rail 44. Consequently, neither the sheet metal part 46 nor the guide component 42 needs to be particularly fixed or overly dimensioned, making it possible to achieve an especially lightweight and compact structural design.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A seat arrangement for a motor vehicle, the seat arrangement comprising:
   a vehicle seat that can be shifted in a longitudinal direction and a transverse direction;
   a rail guide with a guide component coupled to the vehicle seat or vehicle and a guide rail coupled to the vehicle or the vehicle seat;
   an installation section with a locking device, wherein the locking device is moved from a release position in which the guide component is guided along the installation section or introduced into the installation section, into a locked position, in which the installation section is locked relative to the guide component by the locking device,
   wherein the locking device is pivoted from the release position into the locked position,
   wherein the locking device includes a swiveling locking element configured to release or lock the installation section, wherein the guide component, upon movement along the guide rail, is configured to press against and pivot the swiveling locking element into the locked position.

2. The seat arrangement according to claim 1, wherein the locking device is automatically moved from the release position into the locked position.

3. The seat arrangement according to claim 2, wherein the locking device is automatically moved by shifting the vehicle seat in the longitudinal direction and/or the transverse direction.

4. The seat arrangement according to claim 3, wherein the locking device is automatically moved by mechanically coupling a movement of the vehicle seat with a movement of the locking device.

5. The seat arrangement according to claim 1, wherein the locking device is clamped or latched in the locked position automatically.

6. The seat arrangement according to claim 5, wherein the locking device is clamped or latched in a detachable manner.

7. The seat arrangement according to claim 5, wherein the locking device has a locking element and the locking element is clamped or latched in the locked position automatically.

8. The seat arrangement according to claim 1, wherein the guide rail comprises a sheet metal part and a recess and/or depression in the sheet metal part.

9. The seat arrangement according to claim 8, wherein the swiveling locking element is pivoted to the sheet metal part, configured as a plate, and/or arranged parallel to the sheet metal part.

10. The seat arrangement according to claim 9, wherein the swiveling locking element is arranged parallel to the sheet metal part in a horizontal plane.

11. The seat arrangement according to claim 9, wherein the swiveling locking element exhibits a first latching means that is latched in the locked position with a second latching means on the sheet metal part.

12. The seat arrangement according to claim 11, wherein the swiveling locking element, on a side facing the sheet metal part, exhibits the first latching means.

13. The seat arrangement according to claim 11, wherein the first latching means is a latching projection.

14. The seat arrangement according to claim 11, wherein the second latching means is a latching recess or depression on the sheet metal part.

15. A seat arrangement for a motor vehicle, the seat arrangement comprising:
a vehicle seat that can be shifted in a longitudinal direction and a transverse direction;
a rail guide with a guide component coupled to the vehicle seat or vehicle and a guide rail coupled to the vehicle or the vehicle seat;
an installation section with a locking device, wherein the locking device is moved from a release position in which the guide component is guided along the installation section or introduced into the installation section, into a locked position, in which the installation section is locked relative to the guide component by the locking device,
wherein the guide rail exhibits a first guide section that extends in the longitudinal direction, into which the installation section runs laterally, wherein the installation section extends at a right angle relative to the first guide section and/or exclusively in the transverse direction.

16. The seat arrangement according to claim 15, wherein the guide rail has a front and a back, and wherein the guide rail exhibits an inclined second guide section, which extends transverse to the longitudinal direction and transverse to the transverse direction, and adjoins the first guide section toward the back in the longitudinal direction, wherein the inclined second guide section proceeds from the first guide section and extends in the same transverse direction as the installation section and/or that the inclined second guide section extends transverse to the longitudinal direction in such a way that the vehicle seat is automatically also shifted toward a middle of the vehicle given a shift toward the back in the longitudinal direction, wherein the guide rail exhibits a third guide section that adjoins the inclined second guide section toward the back in the longitudinal direction, and if necessary extends exclusively in the longitudinal direction.

17. A seat arrangement for a motor vehicle, the seat arrangement comprising:
a vehicle seat that can be shifted in a longitudinal direction and a transverse direction;
a rail guide with a guide component coupled to the vehicle seat or vehicle and a guide rail coupled to the vehicle or the vehicle seat;
an installation section with a locking device, wherein the locking device is moved from a release position in which the guide component is guided along the installation section or introduced into the installation section, into a locked position, in which the installation section is locked relative to the guide component by the locking device; and
an attachment site with which the vehicle seat is secured to the motor vehicle, wherein the attachment site is covered from above by the vehicle seat or a lower seat structure in an operating position of the vehicle seat in which the guide component is located outside the installation section of the guide rail, and is accessed from above in an installation position of the vehicle seat in which the guide component is situated inside the installation section of the guide rail, wherein the attachment site is covered from above by the vehicle seat or the lower seat structure in each operating position of the vehicle seat.

18. The seat arrangement according to claim 1, further comprising a longitudinal guide rail for shifting the vehicle seat in the longitudinal direction, and a transverse guide rail for shifting the vehicle seat in the transverse direction, and/or clamping means separate from the rail guide for clamping the vehicle seat in the longitudinal direction and the transverse direction.

* * * * *